Figure 1:
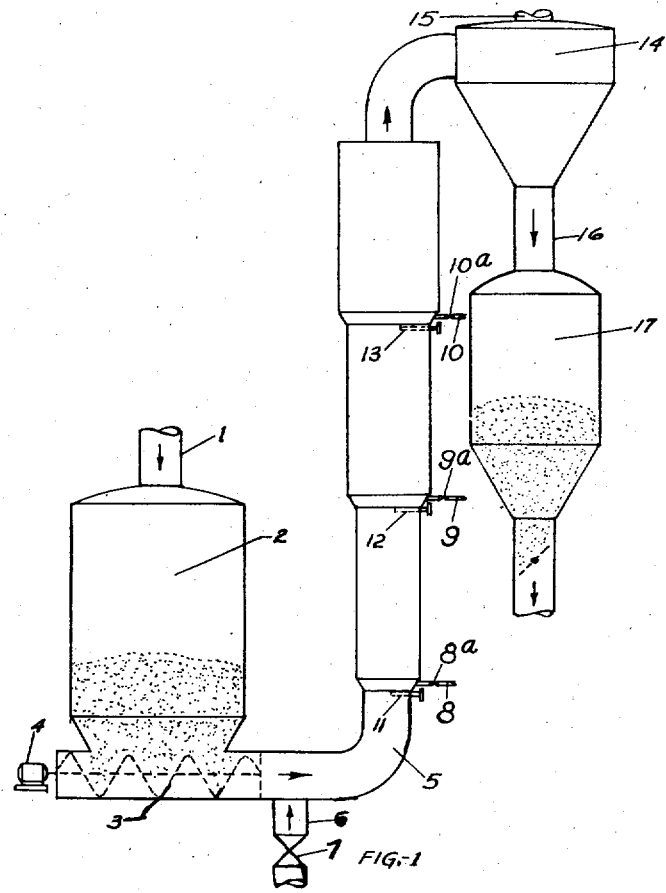

May 1, 1945.  A. BELCHETZ ET AL  2,374,660

REGENERATION OF SPENT CATALYSTS

Filed Oct. 14, 1939

INVENTORS
Henry M. Nelly, Jr.
BY Arnold Belchetz
Walter H. Borcherding
ATTORNEY

Patented May 1, 1945

2,374,660

UNITED STATES PATENT OFFICE 2,374,660

REGENERATION OF SPENT CATALYSTS

Arnold Belchetz, Kew Gardens, N. Y., and Henry M. Nelly, Jr., Jersey City, N. J., assignors to The M. W. Kellogg Co., Jersey City, N. J., a corporation of Delaware Application October 14, 1939, Serial No. 299,410

2 Claims. (Cl. 252—242)

This invention relates to catalytic hydrocarbon conversion processes in which the activity of a catalyst is progressively decreased during a conversion step by the deposition of carbonaceous material thereon, and in which the original activity of the catalyst is subequently substantially restored by burning off the carbonaceous material with an oxidizing gas.

The invention is especially well exemplified by its application to the regeneration of spent catalysts derived incident to the catalytic conversion of high-boiling hydrocarbons to low-boiling hydrocarbons as, for example, the catalytic cracking of petroleum crudes or gas oils to low-boiling motor fuels such as gasoline. In such conversions the oil undergoing treatment is contacted in the vapor phase with the catalyst for a time and at a temperature suitable for the desired conversion. This treatment results in the desired conversion, and also in the deposition of a variable amount of coke or carbonaceous material on the catalyst. With accumulation of this carbonaceous material, activity of the catalyst decreases to a point where it is regarded as spent or deactivated and accordingly must be either discarded or regenerated. In catalytic cracking a relatively large amount of coke is thus formed, usually about 3 to 4% by weight of the charge. The catalysts normally employed for catalytic cracking comprise a complex compound or mixture containing alumina and silica, prepared either from certain types of natural clays or synthetically. The catalytic activity of such materials is dependent both upon their chemical composition and physical structure, and it is essential that these factors are not unfavorably altered to a very substantial extent during the regeneration operation. The limitations thus imposed are such that the regeneration of the spent catalysts has been recognized as the most difficult problem arising in connection with the successful commercial application of catalytic cracking processes. Since these catalysts are sensitive at high temperatures, the burning off of the carbonaceous material may readily result in a complete or partial destruction of their catalytic activity. They may also be detrimentally affected by treatment with water under certain conditions. Because of these circumstances, the regeneration processes proposed at present normally entail the dilution of the air used for regeneration with a large quantity of inert gas, such as flue gas, or indirect heat exchangers for the purpose of maintaining the spent catalysts during regeneration at a temperature below the deactivation temperature. The introduction of flue gas entails a circulation of large amounts of gas and consequent extreme requirements with respect to pumps, size of equipment, etc. Indirect heat exchangers likewise greatly increase the cost of necessary equipment. The provision of a process for regenerating the spent catalyst whereby these disadvantages are avoided is the general object of this invention.

A specific object of the invention is the provision of a process for regenerating the spent catalyst readily and quickly without substantial impairment of its catalytic properties by reason of the application of excessively high temperatures.

A further object of the invention is the provision of such regeneration processes wherein the regeneration may be effected at a relatively high mean temperature without substantial impairment of the catalytic activity.

A further object is the provision of a regeneration process wherein the necessity of diluting the oxidizing gas with an inert gas, such as flue gas, is entirely or largely obviated.

Another object is the provision of a regeneration process wherein finely divided spent catalysts having a relatively high specific surface, and hence relatively difficult to regenerate without exceeding the critical deactivation temperature, may be satisfactorily regenerated. Various other objects and advantages of this invention will be apparent from the following description.

In proceeding in accordance with this invention, combustion of the contaminating carbonaceous deposit is effected while the catalyst in the form of particles, granules, pellets, or the like is suspended in an oxidizing gas. Such a method offers advantages, such as, intimacy of contact between the catalyst particles and the oxidizing gas, continuity of operation, cheapness of equipment, and speed, but, because of the rapidity with which the combustion takes place in suspension, introduces a difficult problem of temperature control. This method involves a highly exothermic reaction which accelerates as the temperature increases, so tending to reach temperatures which would be injurious to a heat sensitive catalyst. In proceeding in accordance with this invention, the tendency towards excessive temperatures is held in check by the controlled injection of liquid water directly into the regeneration zone. Water, having a high latent heat of evaporation and capable of being injected in precisely regulated quantities, affords an almost instantaneously responsive method of controlling regeneration temperatures and one which may easily be made automatic.

This process, as previously indicated, is especially adapted to the regeneration of spent catalysts produced incident to the catalytic cracking of hydrocarbon oils to produce lower-boiling materials suitable for use as motor fuel. The cost of cracking catalysts is too great to permit of their being discarded after deactivation by coke deposition, and regeneration by combustion of the coke has proven feasible. Unfortunately, most of the highly active cracking catalysts are also heat-sensitive, with critical permanent deactivation temperatures ranging upwards of 1000° to 1600° F. The term "deactivation temperature" of catalysts as employed herein signifies the maximum safe regeneration temperature and in excess of which undue impairment of the activity of the catalyst occurs. A fact adding greatly to the utility of this invention i that a cracking catalyst can be repeatedly regenerated at a temperature slightly below its critical deactivation temperature without suffering any impairment in activity whatsoever, and since the union of oxygen with carbon takes place with increasing rapidity and completeness as the temperature is allowed to rise, it has been desirable but not heretofore practicable to conduct the regeneration just below the critical deactivation temperature. This method avoids the danger of permanent deactivation by establishing dependable temperature control, so permitting the highest safe regeneration temperatures to be employed.

The following more detailed description of the invention will be given with reference to the regeneration of a cracking catalyst as representing a preferred exemplification of the invention. However, other illustrative examples might have been chosen from other hydrocarbon processes such as catalytic reforming, catalytic polymerization, and the like.

This invention is especially applicable to the regeneration of finely divided spent catalytic material. Catalytic material of this type is derived, for example, in a method of catalytic cracking heretofore proposed wherein the catalyst in finely divided condition, for example, particles of about 50 to 400 mesh, is suspended in a stream of the vapors of the hydrocarbons undergoing cracking and the suspension passed through a reaction zone at a temperature adapted to the required conversion. Finely divided catalytic material, because of its high specific surface, is especially difficult to regenerate without exceeding the critical permanent deactivation temperature. This process may, however, be applied to catalytic particles or granules of much larger size since granules and lumps of relatively large size may be readily carried in gaseous suspension.

Referring now to the drawing, Fig. 1 illustrates one type of equipment suitable for practicing the invention. A heat-sensitive powdered cracking catalyst which has become coated with a deposit of coke during a conversion step is charged through line 1 to a collecting hopper 2, from which it drops into a solids pump 3 driven by motor 4 and is conveyed to the inlet of an elongated conduit 5 comprising the regenerating zone. An oxidizing gas which may be air, for example, enters the conduit 5 through line 6, its rate of flow being controlled by valve 7. The catalyst is picked up by the oxidizing gas and carried in suspension through the conduit 5 and during its travel therethrough combustion of the carbon occurs whereby the activity of the catalyst is restored. Leaving conduit 5 the catalyst and the suspending gas enter a cyclone separator 14 where separation of the two is effected, the gas leaving through line 15 and the catalyst dropping through line 16 into a collecting hopper 17, whence it may be withdrawn and used in further conversion of oil to be cracked.

Experience has shown that autogenous ignition of the coke on the catalyst as it meets the stream of oxidizing gas will be assured provided the temperature of the coke is above about 600° F., and in some cases temperatures as low as 350° F. have been sufficient. No means of heating to this temperature is shown since the conversion zone from which the contaminated catalyst is withdrawn will ordinarily be at a temperature well above 700° F. Should the catalyst have been allowed to cool, it is preferred to heat the oxidizing gas by any suitable means to a temperature sufficient to ignite the coke, rather than heating the contaminated catalyst.

The amount of gas necessary to carry a given weight of catalyst and the velocity required to maintain the suspension are dependent upon numerous variables but in general, using the preferred particle size of 50 to 400 mesh, it has been found that at a velocity of about 20 feet per second one cubic foot of gas will readily carry three pounds or more of catalyst. The desired velocity is obtained by proportioning the diameter of the conduit 5 to the volume of gas to be used. A jet of steam may be used to pick up the catalyst initially as it is discharged by solids pump 3.

The coke on the catalyst will begin to burn as it meets oxidizing gas entering through line 6, and as it continues to travel through the fore part of conduit 5 its temperature will rise as a result of the liberation of heat of combustion. Under equilibrium conditions the temperature of the suspension at any fixed point along its path will remain constant, with a rising temperature gradient in the direction of flow. At the point where the temperature of the suspension reaches its safe maximum as determined by the critical deactivation temperature of the catalyst, liquid water is injected into the flowing stream through line 8 which terminates in a spray nozzle, regulating the injection rate by means of valve 8a. The turbulence of the stream, the dispersion obtained by spraying, and the high temperature of the stream result in almost instantaneous evaporation of the water and correspondingly rapid lowering of the suspension temperature to a degree depending upon the amount of water injected.

As the suspension continues along conduit 5 past the first spray nozzle 8 its temperature will begin to rise again as additional coke is burned. Wherever the temperature again attains its safe maximum additional lines are provided for water injection, 9 and 10, proceeding in this way throughout the whole length of the regeneration zone to the termination of conduit 5—the length of which, of course, is determined solely by the time required to burn off carbon to the extent desired. Thermocouple wells 11, 12, and 13 are inserted adjacent to each injection nozzle on the upstream side and the flow of water to each nozzle is adjusted to maintain the temperature registered by the nearest thermocouple downstream at the safe maximum. It will be understood that a large flow of water to each nozzle would permit spacing the nozzles farther apart because of the greater drop in temperature produced, but in order to shorten the time required for combustion it is preferred to operate within a range of about 50 degrees below the safe maximum, using a relatively small amount of water to each nozzle and spacing the nozzles correspondingly closer together. Theoretically, of course, the range between the autogenous ignition temperature and the safe maximum is available.

It will be understood that the volume and hence the velocity of the suspending gas will be increased at each water injection point by the revaporization of the injected water. As shown in Fig. 1, the velocity of the suspension may be maintained substantially constant throughout the regeneration zone by enlarging the diameter of the conduit at each water injection point thereby reducing the necessary length of the combustion zone.

Figure 2:
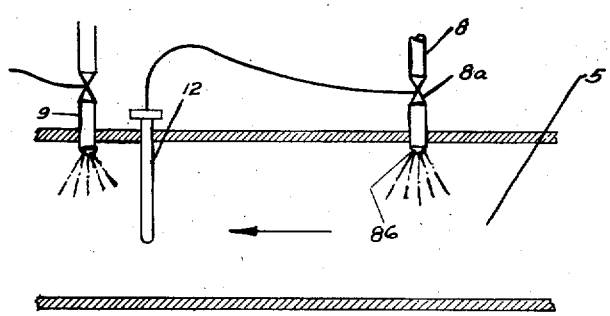

Fig. 2 illustrates a method whereby the injection of water can be automatically controlled to maintain proper temperature conditions along the regeneration conduit. A temperature-responsive element 12 projecting into the interior of conduit 5 adjacent to and upstream from an injection point 9 determines the position of an automatic motor valve 8a in the next upstream water injection line 8.

To illustrate more specifically the manner in which the invention may be practiced, reference will be made to an example taken from experimental plant scale operation.

1,820,000 pounds per hour of a cracking catalyst of the silica-alumina type contaminated with 1.94% by weight of coke was to be regenerated to the desired degree of activity by combustion in suspension, the coke concentration being reduced to 1.5% by weight. It was determined that 37.2% of the total heat liberated in the regeneration would have to be dissipated by injection of water, the remaining heat being absorbed in raising the catalyst and air from their admission temperatures to the exit temperatures of the products of combustion. This required the injection of 33,500 pounds of water per hour. The regeneration zone was maintained under a positive pressure of 25 pounds per square inch gauge. Although the burning of the coke was continuous throughout the regeneration chamber, it is convenient and accurate to consider this chamber as comprising two zones or stages—one, the initial combustion stage, in which the temperature of the suspension is brought to about 1000° F. (determined to be the safe maximum regeneration temperature of the particular catalyst used), and the subsequent combustion zone in which the temperature is maintained at about 1000° F. by injection of water. The following tabulated data show the conditions and results of this operation.

preferably supplied by using the heat available in the regeneration gases for its evaporation. This may suitably be accomplished by passing the hot regeneration gases through a gas turbine to develop power necessary to run a compressor for the circulation of the oxidizing gas and then through an evaporator for the production of a required amount of distilled water. The power requirements of the system are thus supplied by the heat produced during the regeneration reaction.

Having now fully described this invention and the manner in which the same is to be employed, it is claimed:

1. A method of regenerating a spent inorganic catalyst by removal of accumulated carbonaceous material therefrom which comprises suspending the spent catalyst in a stream of oxidizing gas, introducing the suspension at a temperature sufficiently high to initiate combustion into an elongated combustion chamber, passing said suspension through the initial portion of said chamber while permitting combustion to proceed with progressive increase of the temperature of the suspended catalyst to a temperature approximating but not exceeding the deactivation temperature of the catalyst, passing the suspension into a second combustion zone having a substantially greater cross sectional area than said first zone to permit expansion of the regeneration gases and wherein additional carbonaceous material is burned off at temperatures approximating but not exceeding the deactivation temperature, and spraying liquid water into the suspension while passing through said second zone said water being completely vaporized and in quantity sufficient to absorb as latent heat of evaporation and sensible heat and heat liberated by the combustion in excess of that required to maintain the suspended catalyst at the desired temperature and in quantity insufficient to cool the suspension below the combustion temperature of the carbonaceous material.

2. A method of regenerating a spent inorganic catalyst by removal of accumulated carbonaceous material therefrom which comprises suspending the spent catalyst in a stream of air free of any substantial amount of any diluting gas such as flue gas, introducing the suspension at a temperature sufficiently high to initiate combustion into an elongated combustion chamber, passing said suspension through the initial portion of said chamber while permitting combustion to proceed with progressive increase of the temperature of the suspended catalyst to a temperature approximating but not exceeding the deactivation temperature of the catalyst, passing

| Zone | Lb. coke burned/hr. | Zone volume | Time in zone | Per cent coke on cat. | | Mean comb. temp., °F. | Catalyst conc. in gas lb./cu. ft. | |
|---|---|---|---|---|---|---|---|---|
| | | | | In | Out | | In | Out |
| 1 | Cu. ft. 4,440 | Secs. 600 | 2.9 | 1.94 | 1.7 | 900 | 2.72 | 2.22 |
| 2 | 3,600 | 445 | 1.1 | 1.7 | 1.5 | 1,000 | 2.22 | 0.823 |
| Total | 8,040 | 1,045 | 4.0 | | | | | |

The water injected should contain not more than about two parts per million of total solids, in order to avoid the deposition of scale on the catalyst and interior of the regeneration conduit. Distilled water suitable for injection is the suspension into a second combustion zone having a substantially greater cross sectional area than said first zone to permit expansion of the regeneration gases and wherein additional carbonaceous material is burned off at temperatures approximating but not exceeding the deactivation temperature, and spraying liquid water into the suspension while passing through said second zone said water being completely vaporized and in quantity sufficient to absorb as latent heat of evaporation and sensible heat the heat liberated by the combustion in excess of that required to maintain the suspended catalyst at the desired temperature and in quantity insufficient to cool the suspension below the combustion temperature of the carbonaceous material.

ARNOLD BELCHETZ.
HENRY M. NELLY, Jr.

CERTIFICATE OF CORRECTION.

Patent No. 2,374,660.      May 1, 1945.

ARNOLD BELCHETZ, ET AL.

It is hereby certified that error appears in the printed specification of the above numbered patent requiring correction as follows: Page 1, first column, line 6, for "subequently" read --subsequently--; page 3, second column, line 38, claim 1, for "and heat" read --the heat--; and that the said Letters Patent should be read with this correction therein that the same may conform to the record of the case in the Patent Office.

Signed and sealed this 31st day of July, A. D. 1945.

Leslie Frazer (Seal)

Acting Commissioner of Patents.

tures approximating but not exceeding the deactivation temperature, and spraying liquid water into the suspension while passing through said second zone said water being completely vaporized and in quantity sufficient to absorb as latent heat of evaporation and sensible heat the heat liberated by the combustion in excess of that required to maintain the suspended catalyst at the desired temperature and in quantity insufficient to cool the suspension below the combustion temperature of the carbonaceous material.

ARNOLD BELCHETZ.
HENRY M. NELLY, Jr.

CERTIFICATE OF CORRECTION.

Patent No. 2,374,660.   May 1, 1945.

ARNOLD BELCHETZ, ET AL.

It is hereby certified that error appears in the printed specification of the above numbered patent requiring correction as follows: Page 1, first column, line 6, for "subequently" read --subsequently--; page 3, second column, line 38, claim 1, for "and heat" read --the heat--; and that the said Letters Patent should be read with this correction therein that the same may conform to the record of the case in the Patent Office.

Signed and sealed this 31st day of July, A. D. 1945.

Leslie Frazer (Seal)

Acting Commissioner of Patents.